United States Patent
Doerband

(10) Patent No.: US 7,436,520 B1
(45) Date of Patent: Oct. 14, 2008

(54) METHOD OF CALIBRATING AN INTERFEROMETER OPTICS AND OF PROCESSING AN OPTICAL ELEMENT HAVING AN OPTICAL SURFACE

(75) Inventor: Bernd Doerband, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 160 days.

(21) Appl. No.: 11/035,723

(22) Filed: Jan. 18, 2005

(51) Int. Cl.
*G01B 11/02* (2006.01)
(52) U.S. Cl. .................................................. 356/512
(58) Field of Classification Search ......... 356/512–515, 356/489, 495
See application file for complete search history.

(56) References Cited

U.S. PATENT DOCUMENTS

| | | | |
|---|---|---|---|
| 4,340,306 A | 7/1982 | Balasubramanian | |
| 4,697,927 A | 10/1987 | Ono | |
| 4,732,483 A | 3/1988 | Biegen | |
| 5,361,312 A | 11/1994 | Kuchel | |
| 5,473,434 A | 12/1995 | de Groot | |
| 5,488,477 A | 1/1996 | de Groot | |
| 5,768,150 A * | 6/1998 | Sonoda et al. ................ | 702/85 |
| 5,777,741 A | 7/1998 | Deck | |
| 5,982,490 A | 11/1999 | Ichikawa et al. | |
| 6,456,382 B2 | 9/2002 | Ichihara et al. | |
| 6,597,460 B2 * | 7/2003 | Groot et al. ................ | 356/512 |
| 7,123,365 B1 * | 10/2006 | Schulte ........................ | 356/512 |
| 2002/0063867 A1 | 5/2002 | Otto | |
| 2002/0080366 A1 * | 6/2002 | Nakayama ................... | 356/512 |
| 2003/0067609 A1 * | 4/2003 | Morita ........................ | 356/512 |
| 2003/0067684 A1 * | 4/2003 | Kim ............................ | 359/508 |
| 2004/0190002 A1 | 9/2004 | Schulte et al. | |
| 2006/0121257 A1 * | 6/2006 | Brintzinger et al. ......... | 428/209 |

FOREIGN PATENT DOCUMENTS

WO      WO 03/002933 A1      1/2003

OTHER PUBLICATIONS

D. Malacara, "Optical Shop Testing", 2nd Edition, John Wiley & Sons, Inc., 1992, Chapter 1 to 4, pp. 1 to 172.
W. Press et al., "Numerical Recipes in Pascal", Cambridge University Press, Cambridge, 1989, pp. 558 to 565.
D. Malacara et al., "Interferogram Analysis for Optical Testing", Marcel Dekker, Inc., New York, Basel, Hong Kong 1998, pp. 181 to 185.

* cited by examiner

*Primary Examiner*—Tarifur R Chowdhury
*Assistant Examiner*—Jonathon D Cook
(74) *Attorney, Agent, or Firm*—Jones Day

(57) ABSTRACT

A method of calibrating an interferometer apparatus uses a calibrating element having a plurality of structures comprising at least one of projections and indentations formed on a surface of the calibrating element at predetermined positions to generate interference fringes in the interferometer apparatus to be calibrated.

44 Claims, 9 Drawing Sheets

METHOD OF CALIBRATING AN INTERFEROMETER OPTICS AND OF PROCESSING AN OPTICAL ELEMENT HAVING AN OPTICAL SURFACE

BACKGROUND OF THE INVENTION

1. Field of the Invention

The present invention relates to the field of measuring and manufacturing optical surfaces. In particular the invention relates to a method of calibrating an interferometer apparatus for measuring an optical surface and/or a method of processing the optical surface by using the interferometer apparatus.

2. Brief Description of Related Art

An optical substrate having the optical surface can be, for example, an optical component such as an optical lens or an optical mirror used in optical systems, such as telescopes used in astronomy, or systems used for imaging structures, such as structures of a mask or reticle onto a radiation sensitive substrate, such as a resist in a lithographic process. The success of such an optical system is substantially determined by the precision with which the optical surface can be machined or manufactured to have a target shape. In such manufacture, it is necessary to compare the shape of the machined optical surface with its target shape, and to determine differences between the machined and target surfaces. The optical surface is then further machined at those areas where the differences between the machined and target surfaces exceed e.g. a predefined threshold.

In order to precisely measure the shape of an optical surface, an interferometer apparatus is commonly used. Examples of conventional interferometer apparatuses such as a Fizeau interferometer or a Twyman-Green interferometer are given in D. Malacara: "Optical shop testing", 2nd edition, John Wiley & Sons Inc, 1992, pages 1 to 172. Further, examples of such interferometers are disclosed in U.S. Pat. No. 4,732,483, U.S. Pat. No. 4,340,306, U.S. Pat. No. 5,473,434, U.S. Pat. No. 5,777,741, U.S. Pat. No. 5,488,477, which documents are incorporated herein by reference.

The conventional interferometer apparatus usually includes a reference surface which is illuminated with measuring light. Measuring light reflected back from the reference surface is directed onto a camera having a plurality of detector elements. Further, the optical surface to be measured is arranged in a same or a separate beam of measuring light, and the optical surface is also imaged onto the camera by using light interacting with the optical surface to be measured. The light interacting with the optical surface and light reflected from the reference surface generate an interference pattern on the camera. By analyzing this pattern, shape differences between the target surface and the optical surface to be measured can be determined in terms of wavelengths of the measuring light at respective locations on the optical surface. Examples for methods for measuring shape errors of an optical surface by using an interferometer apparatus are e.g. disclosed in U.S. Pat. No. 4,697,927 A1 and U.S. Pat. No. 6,456,382 B2, the contents of which are incorporated herein by reference.

For determining the shape differences at the respective locations on the optical surface, it is necessary to establish a correspondence between lateral coordinate positions of the respective detector elements of the camera and corresponding lateral coordinate positions of the respective locations on the optical surface. This correspondence is determined by the imaging properties of an interferometer optics performing the imaging from the optical surface onto the detector.

US 2002/0080366 A1 discloses a method for determining imaging properties of interferometer optics in connection with establishing correspondences between lateral coordinate positions of respective detector elements and respective locations on an optical surface. This method includes a calibrating step in which a calibrating element is positioned in a beam path of the interferometer apparatus at a location where the optical element to be measured will be positioned during a measuring step. The calibration element is designed such that it has substantially a same effect on the measuring light as the optical element to be measured, with the exception that a plurality of circular apertures is provided in the calibrating element at predetermined positions. These apertures are imaged onto the camera by the interferometer optics, and an image of the apertures taken by the camera is analyzed for determining imaging properties of the interferometer optics, such as a distortion and a scale factor.

It has been noted that the correspondence between lateral coordinate positions on the optical surface and on the camera determined by the conventional method is limited.

SUMMARY OF THE INVENTION

The present invention was made in view of the aforementioned problems, and it is an object of the present invention to provide a method for calibrating an interferometer apparatus allowing to determine optical properties of an interferometer optics with a higher degree of accuracy.

A further object of the present invention is to provide a method of qualifying and manufacturing an optical element using an interferometer apparatus calibrated to a higher degree of accuracy.

According to an exemplary embodiment of the present invention, a calibrating element used for calibrating the interferometer apparatus is designed such that, when the calibrating element is correctly positioned in the interferometer apparatus, a first interference pattern is formed on at least a portion of a light sensitive substrate of a camera of the interferometer apparatus wherein the first interference pattern is generated by wavefronts reflected from a reference surface of the interferometer apparatus and interfering with wavefronts interacting with the calibrating element, wherein the first interference pattern an interference pattern of a predetermined type or a superposition of an interference pattern of the predetermined type and an additional (second) interference pattern. Phase shifts of the interference pattern of the predetermined type are determined in dependence of detector signals generated by the detector elements located in the portion of the light sensitive substrate where the first interference pattern is formed, and imaging properties of the interferometer optics are determined in dependence of such determined phase shifts.

Since a corresponding phase shift can be determined for each detector element with a high precision it is in particular possible to determine a lateral coordinate of that location of the calibrating element which is imaged on each respective detector element with high accuracy. Due to the interference pattern formed on the portion of the light sensitive substrate of the camera information regarding lateral coordinates may be derived for each single detector element with high interferometric accuracy.

In the conventional method discussed above, such information for detector elements on which the apertures are not imaged may be only obtained by interpolation or other limited calculations.

According to an exemplary embodiment the remaining third interference pattern may be used for aligning the calibrating element at its correct position in the interferometer apparatus.

According to a further exemplary embodiment structures comprising a plurality of projections and/or indentations can be formed on a surface of the calibrating element at predetermined positions wherein wavefronts reflected from the structures generate interference fringes (e.g., continuous interference fringes) on the camera. The projections and indentations may be continuously formed without substantial steps over a distance on the surface of the calibrating element which distance, when imaged onto the camera, covers a plurality of detector elements thereon.

It can be advantageous to form the projections and/or indentations using a same machine tool which is used for machining the optical element to be manufactured and qualified using the calibrated interferometer apparatus.

According to a further exemplary embodiment a first grating and a second grating can be provided on the calibrating element. The first and second gratings are designed such that the interference pattern of the predetermined type is generated by wavefronts diffracted by the first grating and interfering with wavefronts diffracted by the second grating.

The present invention further provides a method for manufacturing and/or qualifying an optical element using an interferometer apparatus calibrated as illustrated above.

In an exemplary embodiment, the method of manufacturing the optical surface further includes machining of the optical surface after measuring the same, wherein the machining is performed in dependence of deviations of the measured optical surface from its target shape.

According to a further exemplary embodiment, the method of manufacturing includes a final finishing of the machined optical surface.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Exemplary embodiments discussed below involve, among other things, interferometrically taking measurements of wavefronts generated by reflecting an incident beam provided by an interferometer apparatus from surfaces to be measured. Plural conventional interferometric methods may be used for taking such measurements. Examples of such conventional interferometric methods are disclosed for example, in U.S. Pat. No. 5,361,312, U.S. Pat. No. 5,982,490 and US 2002/0063867A1. The full disclosure of these patents and publications are incorporated herein by reference.

Figure 1:
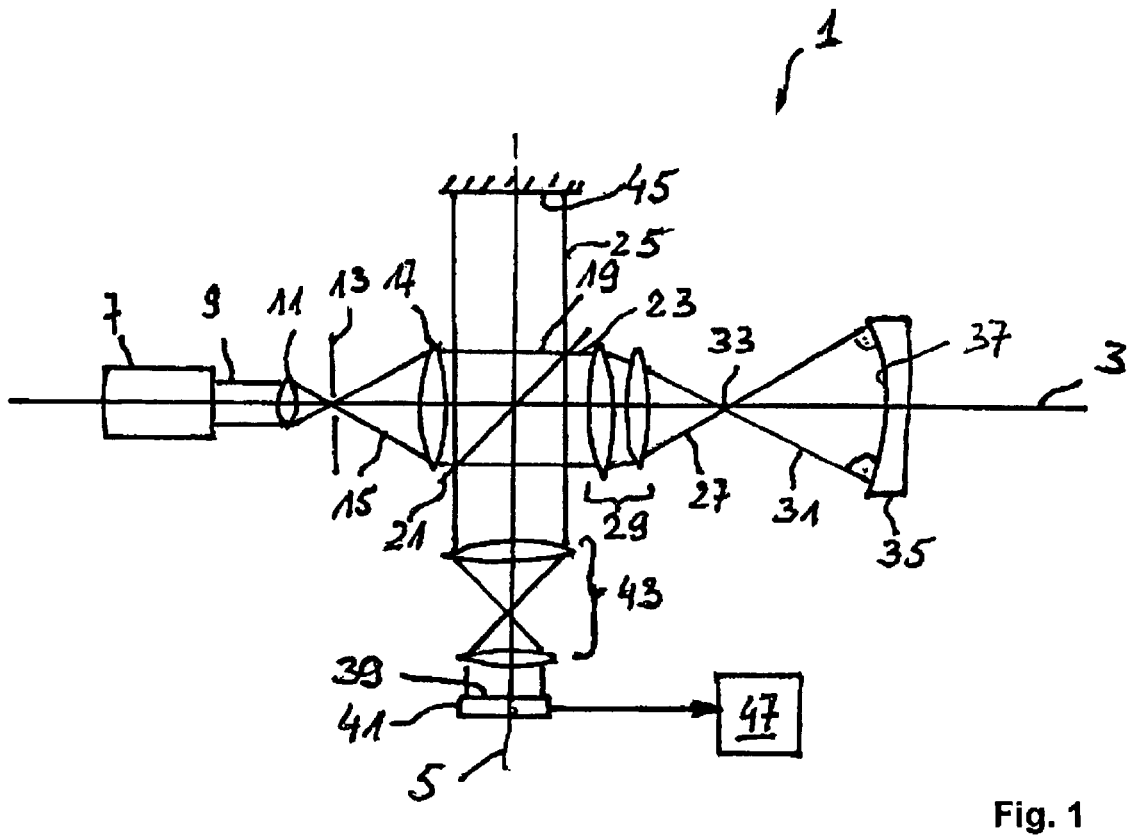
FIG. 1 schematically illustrates an interferometer apparatus of a Twyman-Green type with a calibrating element having projections and indentations.

FIG. 1 illustrates an interferometer apparatus 1 used for measuring and qualifying optical elements to be manufactured. The interferometer apparatus 1 is of a Twyman-Green type having an optical axis 3 intersecting a transverse optical axis 5. A laser light source 7 such as a helium neon gas laser emits a beam 9 of measuring light having a wavelength $\lambda$ 632.8 nm along optical axis 3. An objective 11 collimates light beam 9 onto a pinhole of a spatial filter 13 such that a diverging beam 15 of coherent light having spherical wavefronts originates from the pinhole of spatial filter 13. A collimating lens arrangement 17 transforms diverging beam 15 into a parallel beam 19 separated by a beam splitter 21 into a beam 23 propagating along optical axis 3 and a beam 25 propagating along transverse optical axis 5. Beam 23 is transformed into a converging beam 27 by a lens arrangement 29 and forms a diverging beam 31 downstream of a crossover 33. A calibrating element 35 is positioned at a calibrating position on optical axis 3 such that diverging beam 31 is incident on a concave surface 37 of calibrating element 35. Surface 37 of calibrating element 35 has substantially a same surface shape as the optical element to be manufactured and measured with the interferometer apparatus 1 after calibration thereof, and the calibrating position of calibrating element 35 is chosen such that surface 37 is substantially in a same position and orientation as the optical surface to be measured in the measuring step.

The optical surface to be measured, and the corresponding surface 37 of calibrating element 35 may have a spherical shape or an aspherical shape. The optical surface to be measured and the corresponding surface 37 of calibrating element 35 may be of a concave shape as shown in FIG. 1. They may also have a convex shape and would then be positioned in the beam path of converging beam 27 upstream of crossover 33.

As noted above, the surface shape of surface 37 of calibrating element 35 substantially corresponds to the surface shape of the optical surface of the optical element to be manufactured. However, a regular array of projections and indentations is formed on surface 37, wherein a peak to valley distance between projections and indentations is typically between about 10 and about 300 nm, and a lateral distance between adjacent projections and indentations respectively is typically between 3 and 300 pixels with respect to the resolution of the camera in both x- and y-directions.

Figure 2A:
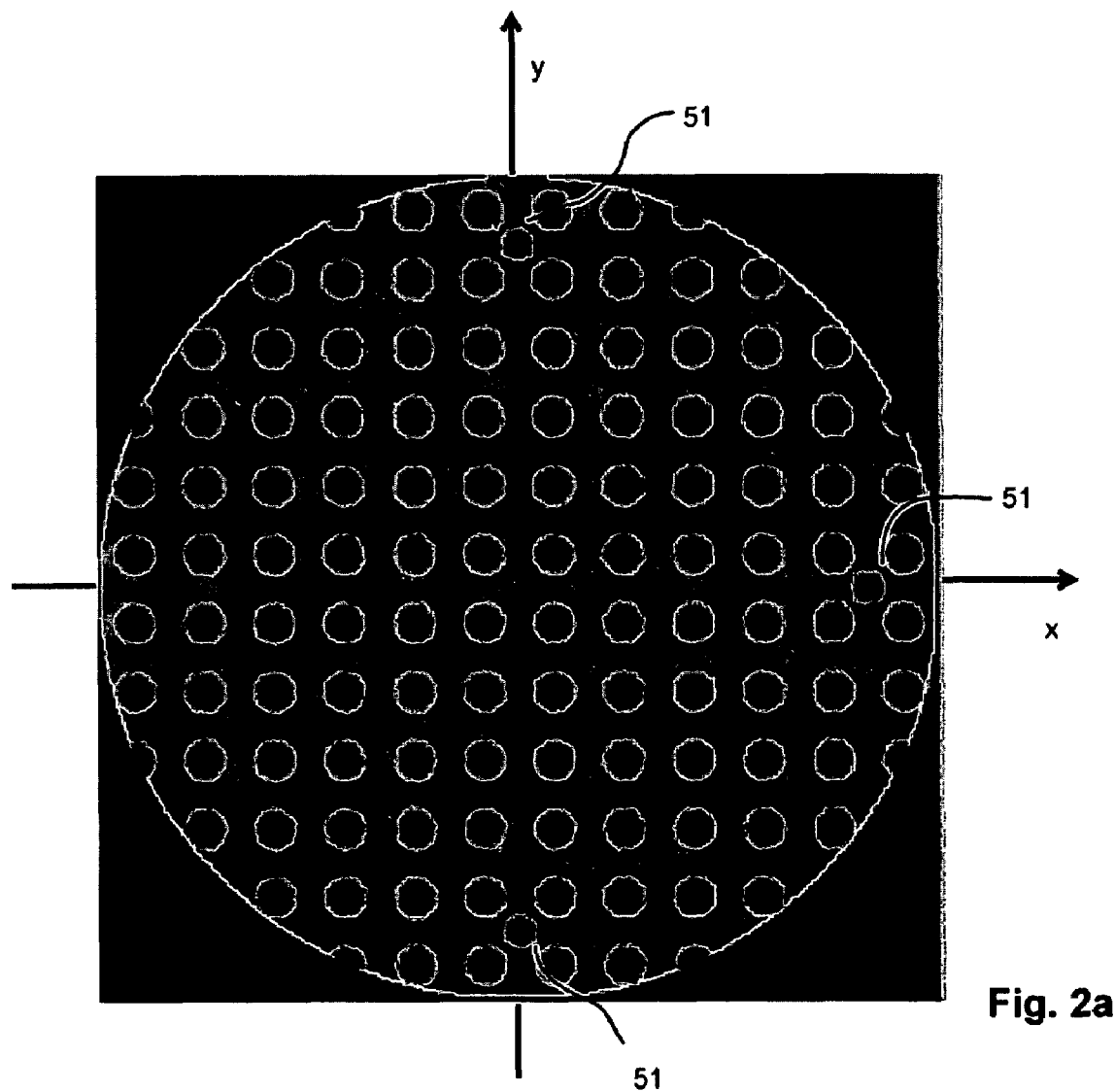
FIG. 2a shows a topographic view of a surface of a calibrating element carrying periodical projections and indentations.
Figure 2B:
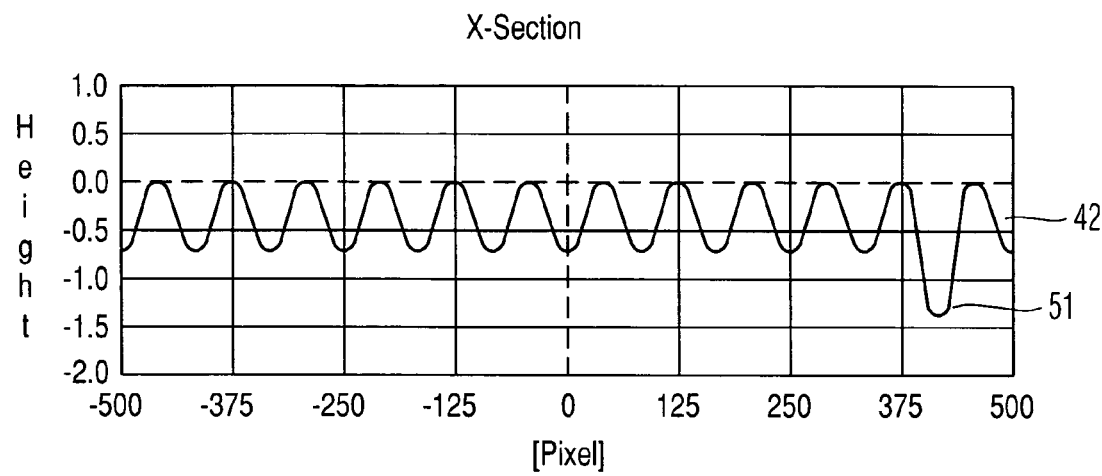
FIG. 2b shows a topographic profile in x-direction of a surface of a calibrating element carrying periodical projections and indentations.

FIG. 2a shows a plan view on a surface of an embodiment of calibrating element 35, wherein a gradation level indicates an elevation of the surface of the calibrating element. FIG. 2b shows a surface profile of the calibrating element along the x-axis shown in FIG. 2a, and FIG. 2b shows a surface profile of the calibrating element along the y-axis shown in FIG. 2b.

Wavefronts reflected back from surface 37 of calibrating element 35 travel back along the beam path of beams 31, 27 and 23 and are reflected by beam splitter 21 for imaging surface 37 onto a light sensitive substrate 39 of a camera 41 through a camera optics 43 arranged on transverse optical axis 5.

Wavefronts of parallel beam 25 are reflected back from a flat reference mirror 45 and pass beam splitter 21 for imaging reference mirror 45 onto the light sensitive substrate 39 of camera 41 through camera optics 43. Camera 41 has 1000× 1000 pixels or detector elements.

Wavefronts reflected back from surface 37 of calibrating element 35 interfere with wavefronts reflected back from reference mirror 45 on the light sensitive substrate 39 and form an interference pattern thereon. Camera 41 is of a CCD type and has a plurality of detector elements or pixels. Light intensities detected by these pixels and transferred to a computer 47 represent an image of the interference pattern formed on light sensitive substrate 39 of camera 41. Such image is shown in FIG. 3.

Figure 3:
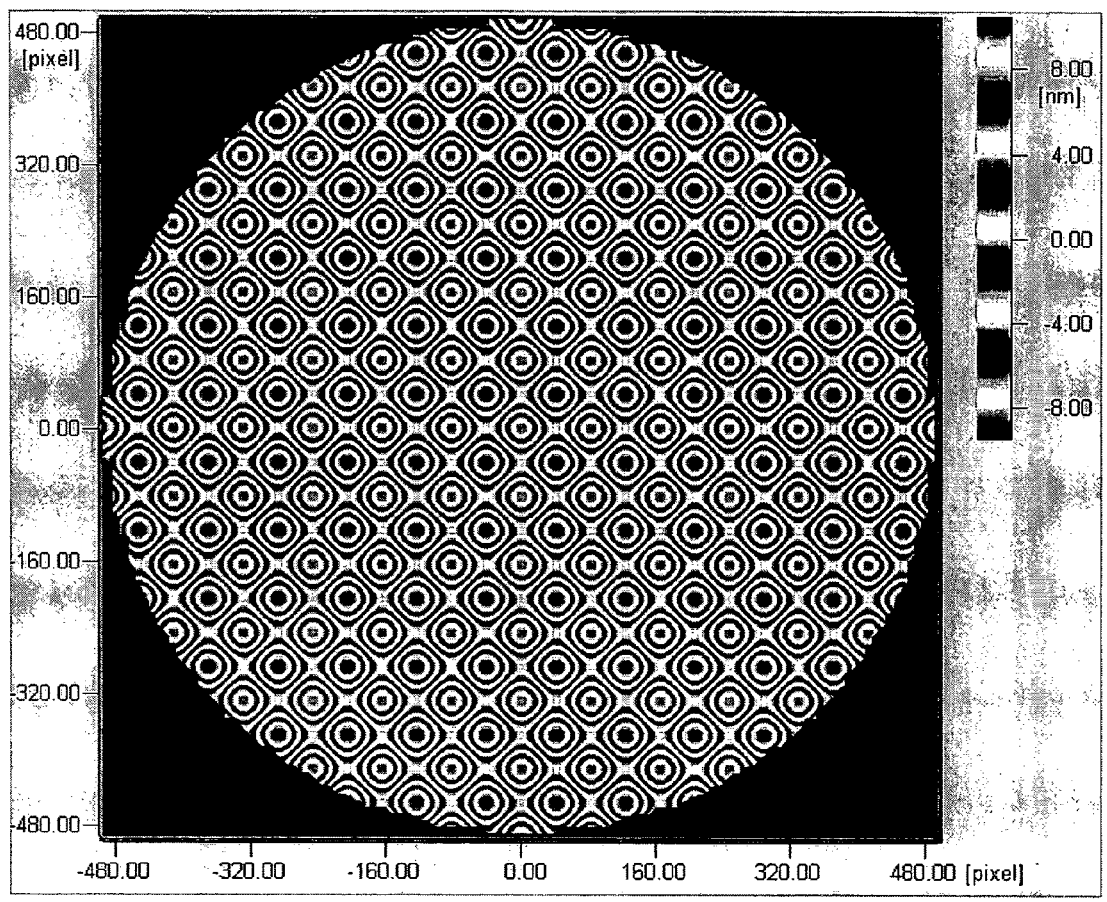
FIG. 3 shows an interference pattern obtained by a camera of the interferometer apparatus shown in FIG. 1.

Light intensities of the image shown in FIG. 3 represent phase differences of wavefronts reflected from surface 37 of calibrating element 35 with respect to wavefronts reflected from reference mirror 45. Since the surface profile of surface 37 is predetermined and known to a high precision, each determined phase shift of a respective pixel may be associated with a corresponding lateral coordinate on surface 37 of calibrating element 35, independent of any deviations of imaging properties of interferometer optics 29, 43 from a perfect imaging property thereof. Since the correspondence between the detector pixels and the lateral coordinates of locations on the calibrating element imaged onto the respective pixel may be determined by the illustrated method, it is also possible to determine the imaging properties of interferometer optics 29 and 43. These imaging properties may be represented, for example, in terms of Zernike coefficients well known in the art.

A mapping between each pixel i, j of camera 41 and the corresponding lateral coordinates x, y on the calibrating surface 37 may be represented as $$x(i,j) = u_0 + u_1 i + u_2 j + u_2 j + u_3 i^2 + u_4 i \cdot j + u_5 j^2 + \ldots \quad (1a)$$

$$y(i,j) = v_0 + v_1 i + v_2 j + v_3 i^2 + v_4 i \cdot j + v_5 j^2 + \ldots \quad (1b)$$

In the present example the surface shape of calibrating surface 37 is represented by $$t(x, y) = a(x, y) + b_x(x, y) \cdot \cos\left(\frac{2\pi x}{T_x}\right) + b_y(x, y) \cdot \cos\left(\frac{2\pi y}{T_y}\right), \quad (2)$$

with $$a(x,y) = a = \text{constant} \quad (3)$$

and $$b_x(x,y) = b_y(x,y) = b = \text{constant} \quad (4)$$

With such surface shape it is possible to determine x and y in above equations 1 and 2 by equations $$x(i, j) = \frac{T_x}{2\pi} \cdot \arctan\left(\frac{t'(i + 2 \cdot \Delta_x, j) - t'(i, j)}{t'(i - \Delta_x, j) - t'(i + \Delta_x, j)}\right) \text{ and} \quad (5a)$$

$$y(i,j) = \frac{T_y}{2\pi} \cdot \arctan\left(\frac{t'(i, j + 2 \cdot \Delta_y) - t'(i, j)}{t'(i, j - \Delta_y) - t'(i, j + \Delta_y)}\right) \quad (5b)$$

In equations 5a and 5b, $\Delta x$ and $\Delta y$ are constant values which may be suitably chosen. According to one example, $\Delta x$ is a number of pixels corresponding to about $T_x/4$, and $\Delta y$ is a number of pixels corresponding to about $T_y/4$.

Also, t'(i,j) in equations 5a and 5b represents the measured surface shape of the calibrating surface after the removal of low frequency surface deviations, such as noise and shape errors at a spatial frequency below a frequency corresponding to the periods $T_y$ and $T_y$, respectively.

The evaluation of equations 5a and 5b includes handling of ambiguities resulting from the arctangent, which is defined only over a limited range of angles, $-\pi/2$ to $+\pi/2$. For determining x(i,j) and y(i,j) across the whole surface of the detector unwrapping calculations may be performed which correspond to a phase unwrapping used in conventional determining of a surface shape from a detected interferogram. Background information on phase unwrapping is illustrated in chapters 14.6 and 14.12 of the book edited by Daniel Malacara, "Optical Shop Testing", $2^{nd}$ edition, Wiley Interscience Publication (1992), and in D. Malacara, M. Servin, Z. Malacara, "Interferogram Analysis for Optical Testing", Marcel Dekker, Inc., New York, Basel, Hong Kong, 1998, pages 181 to 185.

The coefficients $u_0, u_1, u_2, u_3, \ldots$ and $v_0, v_1, v_2, v_3, \ldots$ in equations 1a and 1b may be determined by regular least square fitting methods as described for example in W. Press, B. P. Flannery, S. A. Teukolsky, W. T. Vetterling: Numerical Recipes in Pascal, Cambridge University Press, Cambridge, 1989, page 558 ff.

Figure 4:
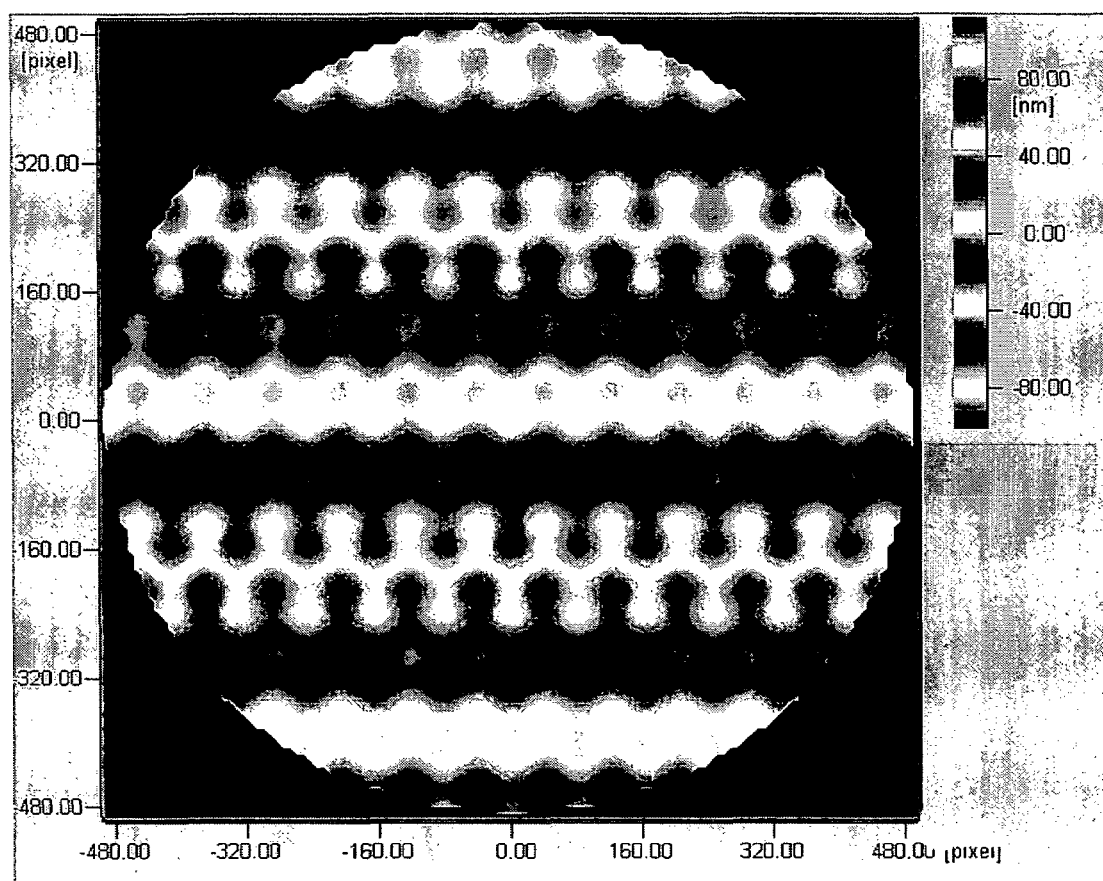
FIG. 4 shows an interference pattern obtained by the camera of the interferometer apparatus shown in FIG. 1 when a calibrating element is tilted.
Figure 5:
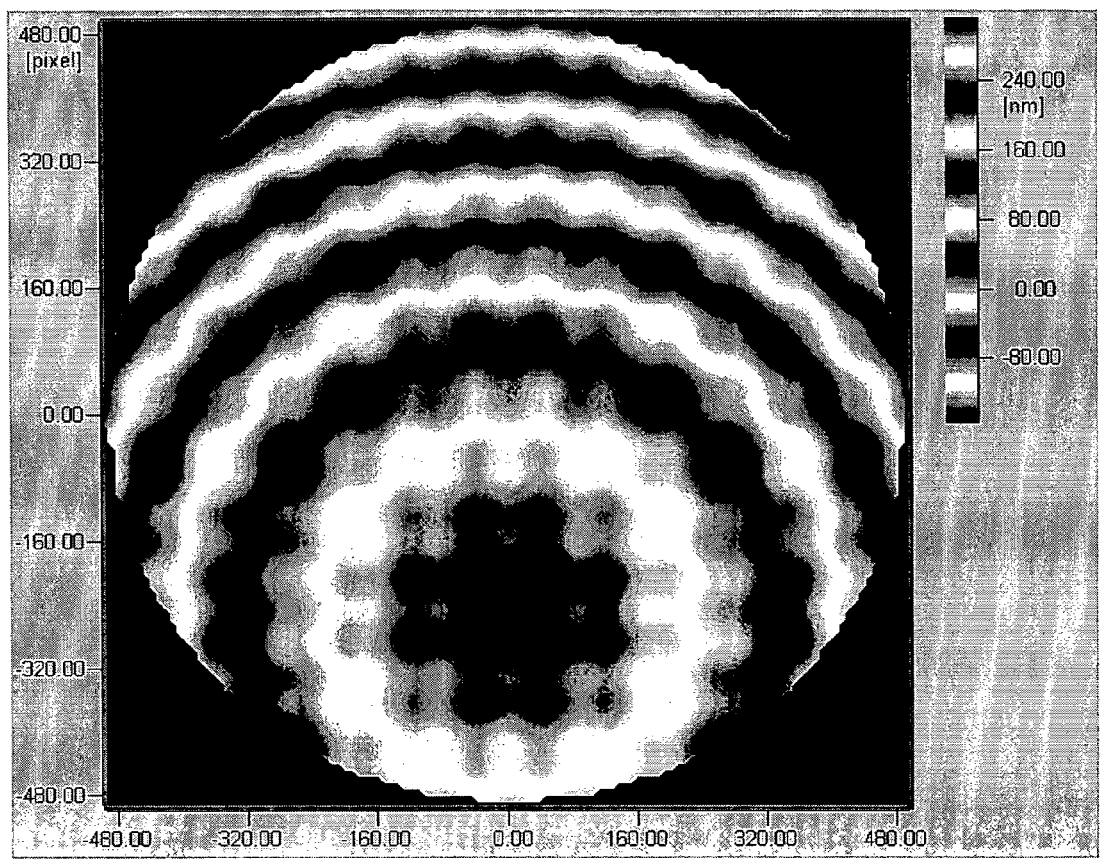
FIG. 5 shows an interference pattern obtained by the camera of the interferometer apparatus shown in FIG. 1 when the calibrating element is displaced along an optical axis of the interferometer apparatus.

The image of FIG. 3 shows a first interference pattern which can be an interference pattern of a predetermined type. The predetermined type corresponds to the geometry or topography of the plurality of projections and indentations provided on the calibrating surface, resulting in interference fringes formed as closed circles or dots in a substantially rectangular array arrangement. Such interference pattern is only formed if the calibrating surface is arranged in a correct position and orientation with respect to optical axis 3. A tilt about the x-axis, for instance, would result in an interference pattern which is a superposition of the interference pattern of the predetermined type and an additional (second) interference pattern such as horizontally extending fringes. An example of such type of superimposed patterns is shown in FIG. 4. FIG. 5 shows an example of a ring-shaped additional interference pattern superimposed with the pattern of the predetermined type resulting from a displacement of the calibrating element along the optical axis. Other displacements of the calibrating element from its correct position would result in other types of additional interference patterns superposed with the interference pattern of the predetermined type. Thus, the additional interference pattern may be used as a positioning aid, i.e. the position of the calibrating element 35 may be adjusted such that the additional pattern vanishes, as shown in FIG. 3. It is, however, also possible to design the calibrating element such that a correct position of the calibrating element results in a non-vanishing further interference pattern, also of a predetermined type, for ease of positioning.

Figure 2C:
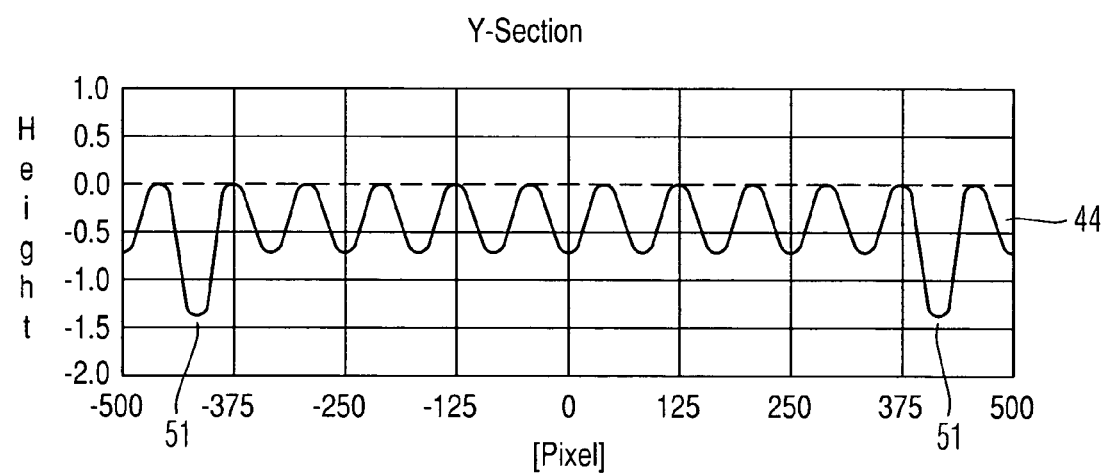
FIG. 2c shows a topographic profile in y-direction of a surface of a calibrating element carrying periodical indentations.

The above illustrated method of adjusting the position of the calibrating element in dependence of the further interference pattern is useful for a fine adjustment of the position. For making a first rough positioning of the calibrating element easier, the calibrating element may be provided with three marks 51 on its surface as indicated in FIGS. 2a, 2b, 2c. The positioning marks 51 are located close to the periphery of the calibrating surface 37 wherein two marks are located on the y-axis and one mark is located on the x-axis. The positioning marks 51 are formed such that they will appear in the image of the calibrating surface on the detector even when the interference pattern of the predetermined type will not be correctly formed due to an incorrect alignment of the calibrating element. The positioning marks 51 may then be used for a first rough alignment of the calibrating element until the further interference pattern is generated such that it can be recognized in the image and used for the further alignment. The concept of the positioning marks 51 is included in the illustration of the topography of the calibrating element shown in FIGS. 2a, 2b, 2c. It is to be noted, however, that the embodiment of the calibrating element used for obtaining FIGS. 3, 4 and 5 did not comprise such positioning marks.

The positioning marks can have, for example, a Gaussian surface shape according to the following equation $$g(x, y) = c \cdot e^{\frac{(x-x_0)^2+(y-y_0)^2}{2 \sigma^2}}. \tag{6}$$

It is, however, possible to use surface shapes differing therefrom, or to provide positioning marks by some other means, such as a reticle, a fiducial or an aperture, such as shown in US 2002/0080366 A1.

With the method illustrated above it is possible to position and align a calibrating element with an increased accuracy and to determine imaging properties of the interferometer optics with increased accuracy.

Figure 6:
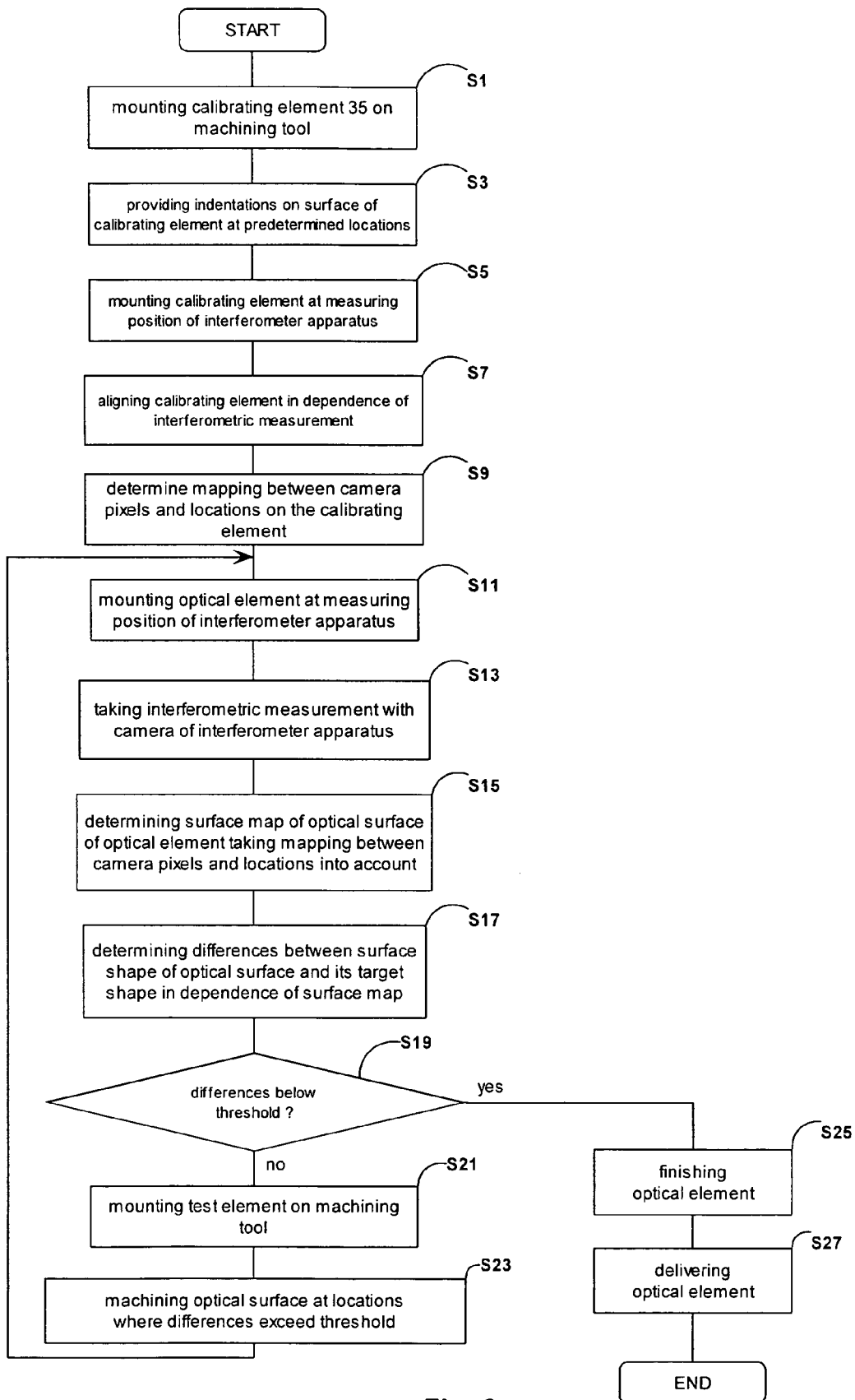
FIG. 6 is a flow chart illustrating a method of calibrating the interferometer apparatus shown in FIG. 1 and manufacturing an optical element using the calibrated interferometer apparatus.

An exemplary method of manufacturing and qualifying an optical element will be illustrated with reference to the flow chart of FIG. 6 below.

Before measuring and testing the optical surface of the optical element to be manufactured using the interferometer apparatus 1, the apparatus is calibrated using the calibrating element 35. Thus, first the calibrating element 35 has to be manufactured. The calibrating element 35 is manufactured from an optical substrate substantially identical with the optical element to be manufactured, i.e. having a substantially same surface shape. Such substrate is mounted on a machining tool (in a step S1). The machining tool is advantageously an ion beam machining tool using an ion beam to remove substrate material at predetermined locations on the substrate surface. The machining tool is computer controlled such that the array of indentations and protrusions is formed on the surface of the substrate (S3) which is then mounted in the interferometer apparatus 1 as shown in FIG. 1 to be used as calibrating element 35 (S5).

The calibrating element 35 is then aligned such that a detected image of a generated interference pattern is of a predetermined type having the array of circular interference fringes and showing no further interference fringes (S7).

The image of the interference pattern is analyzed for determining the mapping between camera pixels and locations on the calibrating surface 37 (S9) for calibrating the interferometer optics.

Thereafter, the calibrating element 35 is removed from the interferometer apparatus and the optical element to be manufactured is positioned at a measuring position of the interferometer apparatus (S11) and an interferometric measurement of the optical surface of the optical element is taken using the camera of the interferometer apparatus (S13). The interferometric measuring result is then processed by taking into account the determined mapping between camera pixels and locations such that a deficiency of imaging properties of the interferometer optics is corrected in the interferometric measurement (S15).

Thereafter, differences between the surface shape of the optical surface and its target shape are determined wherein deficiencies of the optical properties are taken into account (S17) and it is then determined whether these differences are below a predetermined threshold (S19). If the differences exceed the threshold, the optical element is mounted on the machining tool (S21) and is processed at those locations where the differences exceed the predetermined threshold for reducing these differences (S23). The machining tool used for machining the optical element is the same machining tool used for providing the plurality of projections and indentations on the calibrating element. By using the same machining tool both for manufacturing the calibrating element and the optical element to be manufactured any positioning errors of the machining tool are compensated for. The processing may comprise magneto-rheological fluid processing, ion beam processing, fluid jet processing, chemical and/or mechanical polishing, etching, milling, grinding, and hot or cold coating processes.

After machining the optical surface the optical element is again mounted at the measuring position of the interferometer apparatus (S11) and the process for determining differences between the surface shape of the optical element and its target shape (Steps S13, S15, S17 S19) are repeated.

If the determined differences are below the threshold in step S19, a finishing step 25 is performed on the optical surface.

The finishing may include, for example, a final polishing of the surface and/or depositing a reflection coating or an anti-reflection coating. A reflection coating may include, for example, a plurality of material layer pairs, for example 40 pairs of alternating molybdenum and silicon layers, or other suitable layers. Thicknesses of these layers may be about 5 nm and will be adapted to a wavelength to be reflected from the optical surface such that a reflection coefficient is substantially high. Finally, the reflection coating may be covered by a cap layer for passivating the reflection coating. The cap layer may include a layer formed by depositing ruthenium or other suitable metal or compound, for example.

An anti-reflection coating which is intended to reduce reflections of radiation of an interface of an optical element, such as a lens element or a mirror, may include magnesium fluoride or lanthanum oxide or other conventional materials.

The above mentioned threshold value will differ depending upon the application of the optical surface in the optical system for which it is designed. For example, if the optical surface is a lens surface in an objective for imaging a reticle structure onto a resist with radiation of a wavelength $\lambda=193$ nm, such threshold value may be in a region of about 2 nm to 10 nm, and if the optical surface will be used as a mirror surface in an imaging objective using EUV (extreme ultraviolet) radiation with a wavelength of $\lambda=13.5$ nm, the threshold value may be in a region of about 0.1 nm to 1.0 nm.

It is to be noted that it is not necessary that the above mentioned threshold is a constant threshold over the whole area of the optical surface. It is possible that the threshold is dependent on, e.g., a distance from a center of the surface or some other parameters.

The finished optical element can then delivered and included in an optical system for which it is designed (s27). Thereafter, a next optical element having a surface to be manufactured can be mounted in the interferometer apparatus starting with step S11, and machining of the optical surface can be performed according to steps S13 to S23 as illustrated above.

Figure 7:
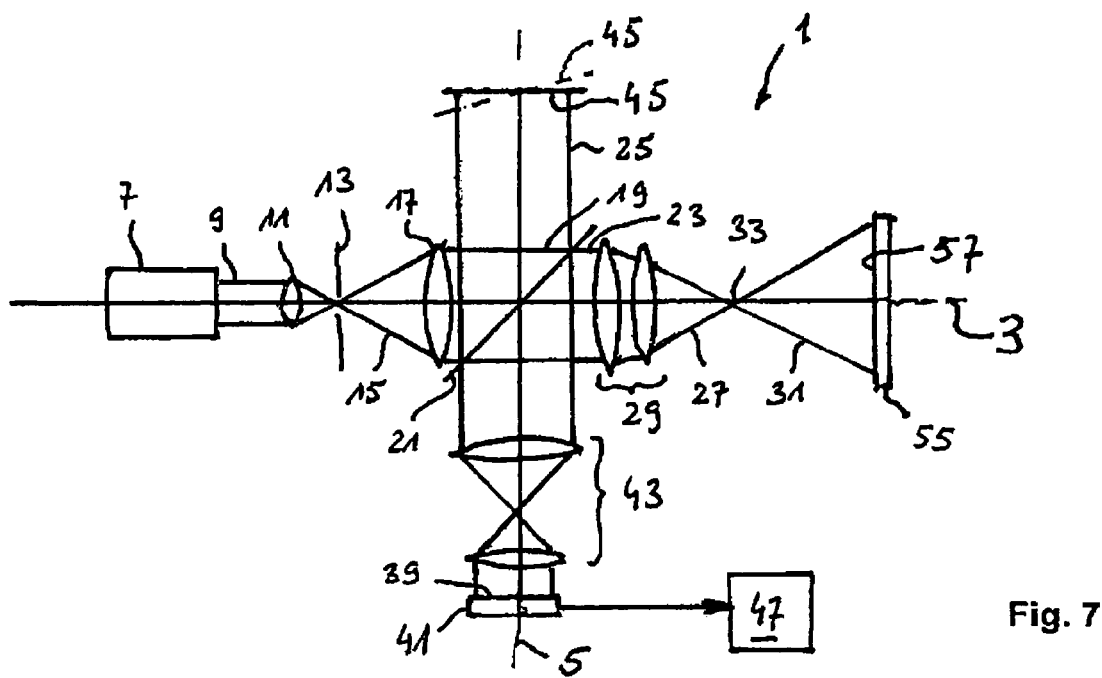
FIG. 7 schematically illustrates an interferometer apparatus of the Twyman-Green type with a calibrating element having two types of gratings provided thereon.

FIG. 7 illustrates another arrangement for calibrating an interferometer apparatus such as shown in FIG. 1 wherein a calibrating element 55 is used. The calibrating element is a flat plate having a front surface 57 on which a computer generated hologram (CGH) is provided. The computer generated hologram represents two different types of gratings designed such that the first grating reflects incident beam 31 in substantially a same manner as the optical element to be manufactured would reflect the incident beam 31 when provided at the measuring position. An interference pattern generated on light sensitive substrate 39 of camera 41 by wavefronts interacting with the first grating and interfering with wavefronts reflected from reference mirror 45 is observed for improving the alignment of calibrating element 55 in the interferometer apparatus 1. For example, the first grating can be designed such that it leaves no remaining interference pattern in the detected image when the calibrating element 55 is correctly aligned.

Thereafter, an interference pattern generated by wavefronts of beam 31 interacting with the first grating and interfering with wavefronts of beam 31 interacting with the second grating are observed. To make such observation easier, reference mirror 45 can be tilted as illustrated with broken lines in FIG. 7, such that wavefronts reflected from the reference mirror 45 do not contribute to the interference pattern to be observed.

Figure 8:
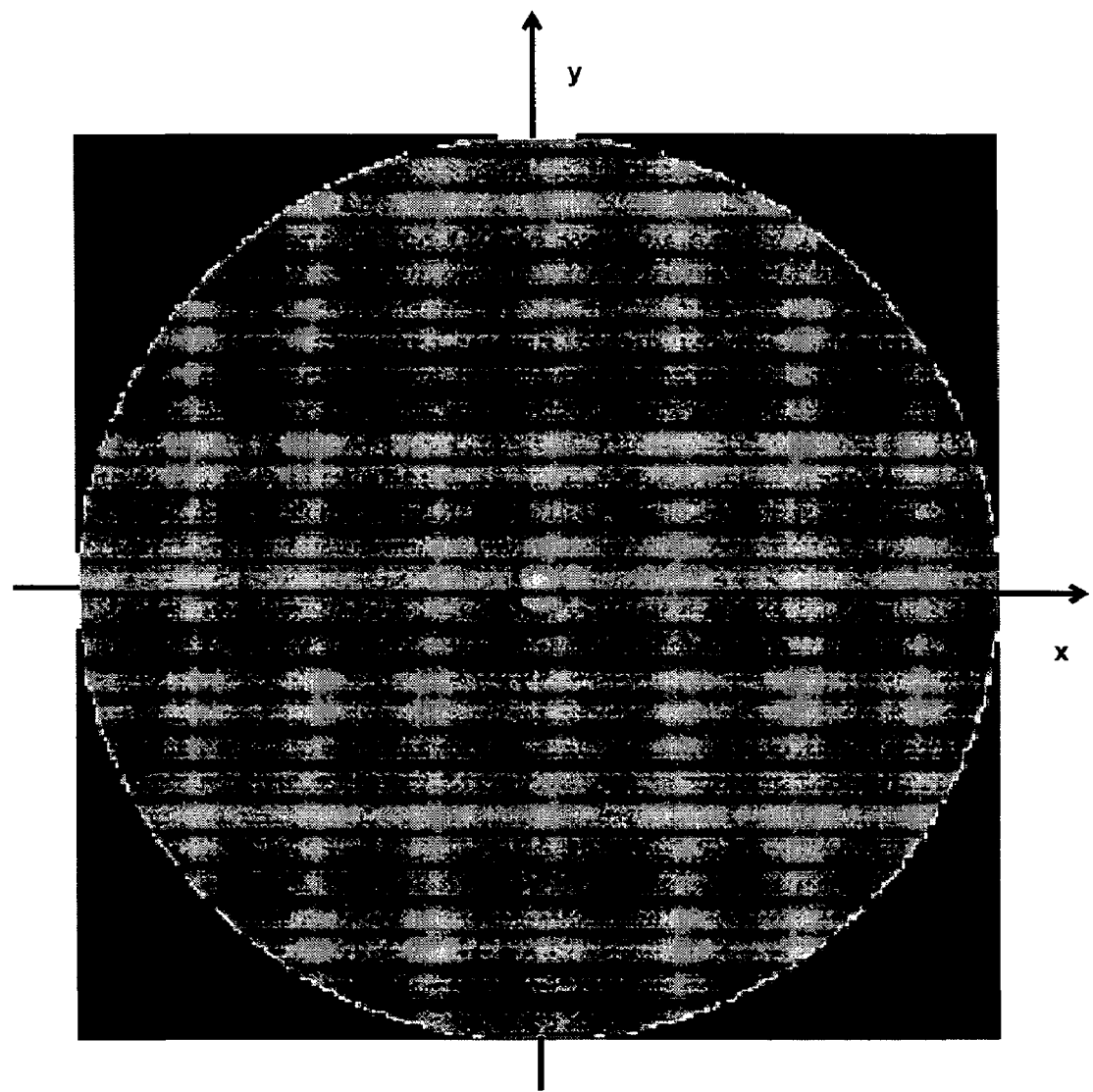
FIG. 8 shows an interference pattern obtained by a camera of the interferometer apparatus shown in FIG. 7.

The second grating can be designed such that the interference pattern resulting from the interference of wavefronts interacting with the first and second gratings are of a predetermined type. FIG. 8 shows an example of an interference pattern of such predetermined type having horizontally extending stripes. From these horizontally extending stripes phase shifts are determined as described above for determining imaging properties of the interferometer optics. It is to be noted that with the interference pattern of the type with the horizontal stripes, information regarding the imaging properties is only derivable with respect to the vertical direction. For obtaining a full determination of the imaging properties the calibration may be repeated by rotating the calibrating element 90 degrees about optical axis 3. It is, however, also possible to design the second grating such that the interference pattern is of a type such that the geometry of the interference fringes allows determination of imaging properties in both x- and y-directions.

Figure 9:
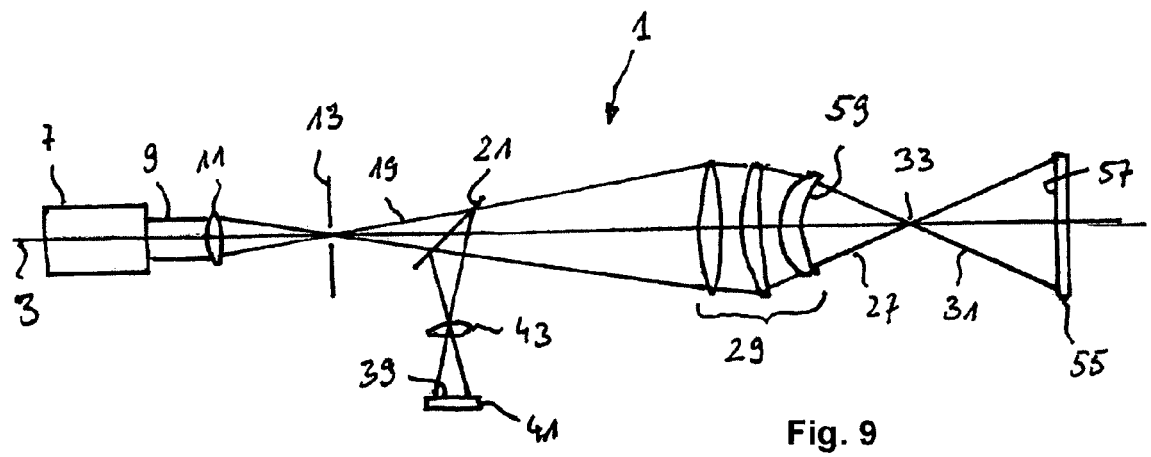
FIG. 9 schematically illustrates an interferometer apparatus of a Fizeau type having a calibrating element with two types of gratings provided thereon.

FIG. 9 shows an interferometer apparatus of a Fizeau type which can be calibrated by a calibrating element 55 in a manner similar to that described with reference to FIG. 7 above.

The interferometer apparatus 1 of FIG. 9 comprises a laser light source 7 for generating a beam of measuring light 9 collimated by a lens or lens arrangement 11 onto a pin hole of an aperture 13 such that a divergent beam 19 is emitted from the pin hole. The diverging beam 19 is transformed into a converging beam 27 by a lens arrangement 29 of a plurality of lenses. The converging beam 27 forms a cross-over at a location 33 on an optical axis 3 and is a divergent beam 31 downstream thereof. The diverging beam 31 interacts with gratings provided on a front surface 57 of calibrating element 55 positioned at a calibrating position on optical axis 3.

The arrangement 29 of lenses is a Fizeau lens arrangement having a Fizeau surface 59 provided on a concave lens surface 59 closest to crossover 33. Wavefronts reflected from Fizeau surface 59 interfere with wavefronts reflected from the optical surface to be measured and positioned at a measuring position of the interferometer apparatus 1 on a light sensitive substrate 39 of a camera 41. Deviations of a surface shape of the optical surface of the optical element to be measured are determined in dependence of an interferometric measurement by camera 41 of interference patterns formed by wavefronts reflected from Fizeau surface 59 and interfering with the wavefronts interacting from the optical surface.

For calibrating the interferometer optics 29, 43 the calibrating element 55 can be provided with two different gratings on its front surface 57. The two different gratings can be similar to those illustrated above with reference to FIGS. 7 and 8. In the example of FIGS. 7 and 8 both the first and second gratings extend over substantially a whole surface of the calibrating element. At the time when the interference pattern generated by wavefronts interacting with the first grating and the second grating is observed, it is possible to position reference mirror 45 such that wavefronts reflected therefrom do not contribute to the detected interference patterns. In the Fizeau interferometer of FIG. 9 it is, however, not possible to tilt or remove the lens provided with Fizeau surface 59, and wavefronts reflected from Fizeau surface 59 will substantially contribute to an interference of wavefronts interacting with the first and second gratings of the calibrating element 55.

For that reason, the first grating can be provided only on a right half of calibrating surface 57 of calibrating element 55, and the second grating can be provided only on a left half thereof.

Figure 10:
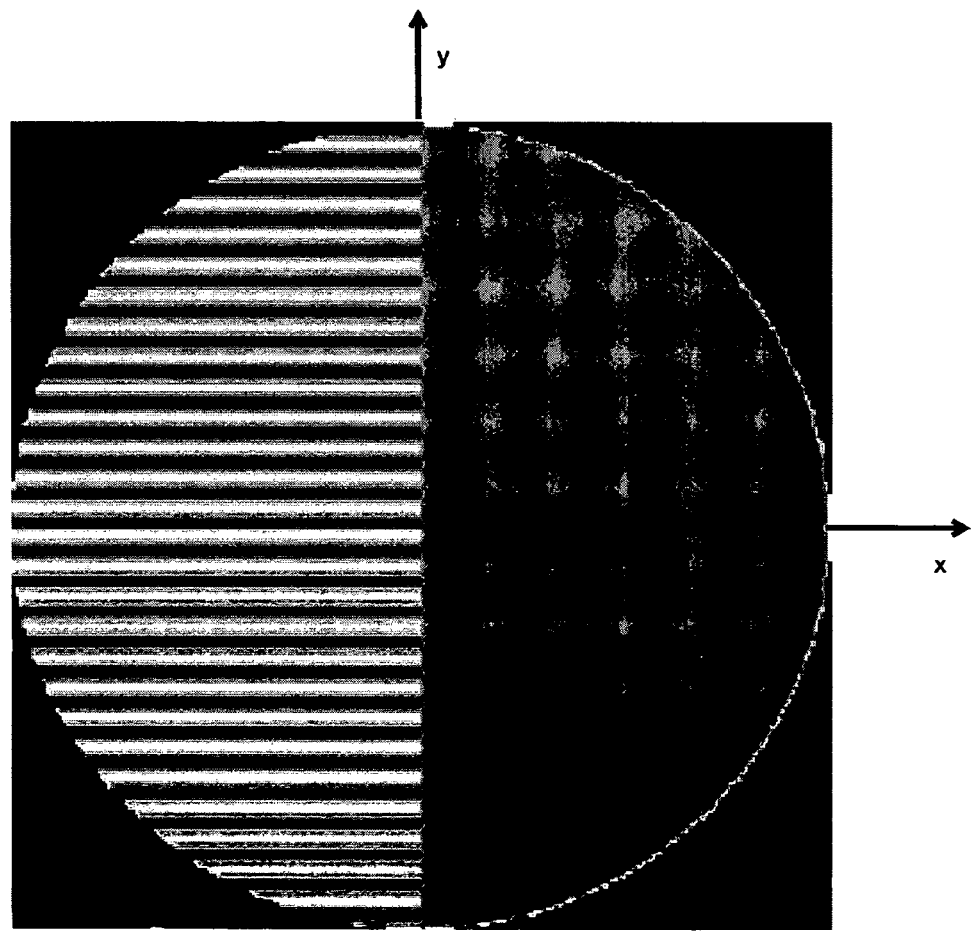
FIG. 10 shows an interference pattern obtained by a camera of the interferometer apparatus shown in FIG. 9.

An image of an interference pattern formed thereby is shown in FIG. 10. The first grating provided in the right half of calibrating surface 57 is designed such that wavefronts interacting with the first grating interfere with wavefronts reflected from Fizeau surface 59 and generated a vanishing interference pattern when the calibrating element 55 is correctly aligned with respect to the interferometer optics.

The second grating provided only on the left half of calibrating surface 57 is designed such that wavefronts interacting with the second grating and interfering with wavefronts reflected from Fizeau surface 59 generate an interference pattern of a predetermined type when the calibrating element 55 is correctly aligned with respect to the interferometer optics.

In the example of FIG. 10 the second grating is designed such that the predetermined type of interference pattern comprises horizontally extending fringes in the left half of the image. Imaging properties of one half of the interferometer optics may be determined with respect to the y-direction in the image of FIG. 10 by determining phase shifts the shape of the wavefront from the interference pattern of the predetermined type. For determining the same imaging properties for the other half of the interferometer optics, the calibrating element will be rotated 180 degrees about optical axis 3. For determining the imaging properties with respect to the x-direction the calibrating element will be rotated by 90 degrees for determining one-half of the corresponding imaging properties and thereafter by a further 180 degrees for determining the remaining imaging properties.

In the above, where surface errors are determined by an interferometric measurement, any method for interferogram evaluation may be used. Possible applicable methods are disclosed in the book edited by Daniel Malacara, "Optical Shop Testing", 2nd edition, Wiley interscience Publication (1992). Further, methods of phase shifting interferometry (PSI) may be applied, wherein a plurality of interferograms are analyzed for determining surface errors. Examples of phase shifting interferometry are also presented in the book by Malacara mentioned above as well as in D. Malacara, M. Servin, Z. Malacara, "Interferogram Analysis for Optical Testing", Marcel Dekker, Inc., New York, Basel, Hong Kong, 1998. The phase shift can be advantageously generated by varying the wavelength of the light providing the interferometric measuring beam using a wavelength tuneable light source.

In the above illustrated embodiments the interaction of the beam of measuring light with the surface of the optical element to be tested is a reflecting interaction. The interaction with the optical element within the scope of the present invention, however, can comprise interactions like diffraction if the optical element comprises a grating, optical path changes if the beam of measuring light passes through the optical element to be manufactured, and others.

The interferometer optics which may be calibrated by the methods illustrated above may be designed for measuring spherical optical surfaces and aspherical optical surfaces.

In the above illustrated embodiments the calibrating element can be positioned for calibrating the interferometer apparatus at the same position at which the optical element to be tested is positioned. The calibrating element may, however, be designed such that the calibrating position is substantially different from the measuring position of the optical element to be manufactured.

In the example of FIG. 7 described above the reference mirror is tilted to suppress an interference of three wavefronts, and in the example of FIG. 9 the respective gratings are not provided on a full surface of the calibrating element, for suppressing an interference of three wavefronts. It is, however, possible to use some other techniques for suppressing such multiple interference, such as methods disclosed in U.S. Pat. No. 5,488,477, and WO 03/002933. It is also possible to use white light interferometer methods for a same purpose.

The embodiments described herein are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method for calibrating an interferometer apparatus for measuring an optical surface, the interferometer apparatus comprising a light source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface, the method comprising:

positioning a calibrating element at a calibrating position of the interferometer apparatus;

forming a first interference pattern on at least a portion of a light sensitive substrate of the camera, wherein the first interference pattern is generated by wavefronts that are reflected from the reference surface and that interfere with wavefronts interacting with the calibrating element, wherein the calibrating element is configured such that the first interference pattern is an interference pattern of a predetermined type or a superposition of the interference pattern of the predetermined type and a second interference pattern, and wherein the calibrating element is configured such that the interference pattern of the predetermined type comprises interference fringes arranged in two dimensions according to a predetermined two-dimensional pattern; and determining phase shifts of the first interference pattern in dependence upon detector signals generated by the detector elements located in the portion of the light sensitive substrate where the first interference pattern is formed, and determining imaging properties of the interferometer optics in dependence upon the determined phase shifts wherein the interference fringes of the interference pattern of the predetermined type are arranged in two dimensions according to a predetermined two-dimensional pattern such that predetermined two-dimensional pattern has periodicity in both a first direction and a second direction different from the first direction.

2. The method according to claim 1, wherein the imaging property comprises an aberration and a scale factor.

3. The method according to claim 1, further comprising storing information corresponding to the phase shifts of the first interference pattern in memory.

4. A method for calibrating an interferometer apparatus for measuring an optical surface, the interferometer apparatus comprising a light source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface, the method comprising:

positioning a calibrating element at a calibrating position of the interferometer apparatus;

forming a first interference pattern on at least a portion of a light sensitive substrate of the camera, wherein the first interference pattern is generated by wavefronts that are reflected from the reference surface and that interfere with wavefronts interacting with the calibrating element, and wherein the calibrating element is configured such that the first interference pattern is an interference pattern of a predetermined type or a superposition of the interference pattern of the predetermined type and a second interference pattern; and determining phase shifts of the first interference pattern in dependence upon detector signals generated by the detector elements located in the portion of the light sensitive substrate where the first interference pattern is formed, and determining imaging properties of the interferometer optics in dependence upon the determined phase shifts, wherein the positioning of the calibrating element comprises analyzing the second interference pattern and aligning the calibrating element in the calibrating position in dependence upon the analyzed second interference pattern.

5. A method for calibrating an interferometer apparatus for measuring an optical surface, the interferometer apparatus comprising a light source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface, the method comprising:

positioning a calibrating element at a calibrating position of the interferometer apparatus;

forming a first interference pattern on at least a portion of a light sensitive substrate of the camera, wherein the first interference pattern is generated by wavefronts that are reflected from the reference surface and that interfere with wavefronts interacting with the calibrating element, and wherein the calibrating element is configured such that the first interference pattern is an interference pattern of a predetermined type or a superposition of the interference pattern of the predetermined type and a second interference pattern; and determining phase shifts of the first interference pattern in dependence upon detector signals generated by the detector elements located in the portion of the light sensitive substrate where the first interference pattern is formed, and determining imaging properties of the interferometer optics in dependence upon the determined phase shifts, wherein the calibrating element includes structures comprising at least one of a plurality of projections and a plurality of indentations on a surface of the calibrating element at predetermined positions, wherein wavefronts reflected from the structures generate interference fringes of the interference pattern of the predetermined type.

6. The method according to claim 5, wherein the surface of the calibrating element has a surface shape substantially corresponding to a surface shape of a surface of the optical element to be measured.

7. The method according to claim 5, wherein at least one positioning mark is further formed on the calibrating element, and wherein the positioning of the calibrating element comprises analyzing an image of the at least one positioning mark formed on the camera and aligning the calibrating element in the calibrating position in dependence upon the analyzed image of the at least one positioning mark.

8. A method for calibrating an interferometer apparatus for measuring an optical surface, the interferometer apparatus comprising a light source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface, the method comprising:

positioning a calibrating element at a calibrating position of the interferometer apparatus;

forming a first interference pattern on at least a portion of a light sensitive substrate of the camera, wherein the first interference pattern is generated by wavefronts that are reflected from the reference surface and that interfere with wavefronts interacting with the calibrating element, and wherein the calibrating element is configured such that the first interference pattern is an interference pattern of a predetermined type or a superposition of the interference pattern of the predetermined type and a second interference pattern; and determining phase shifts of the first interference pattern in dependence upon detector signals generated by the detector elements located in the portion of the light sensitive substrate where the first interference pattern is formed, and determining imaging properties of the interferometer optics in dependence upon the determined phase shifts, wherein the calibrating element includes a first grating and a second grating and wherein the interference pattern of the predetermined type is generated by wavefronts that are diffracted by the first grating and that interfere with wavefronts diffracted by the second grating.

9. The method according to claim 8, wherein the reference surface is positioned such that wavefronts reflected from the reference surface substantially do not contribute to the first interference pattern.

10. The method according to claim 8, wherein the positioning of the calibrating element comprises analyzing a third interference-pattern generated by wavefronts that are reflected from the reference surface and that interfere with wavefronts diffracted by the first grating, and aligning the calibrating element in the calibrating position in dependence of the analyzed third interference pattern.

11. A method for calibrating an interferometer apparatus for measuring an optical surface, the interferometer apparatus comprising a light source, a camera having a plurality of detector elements a reference surface and an interferometer optics wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface, the method comprising:

positioning a calibrating element at a calibrating position of the interferometer apparatus;

forming a first interference pattern on at least a portion of a light sensitive substrate of the camera, wherein the first interference pattern is generated by wavefronts that are reflected from the reference surface and that interfere with wavefronts interacting with the calibrating element, and wherein the calibrating element is configured such that the first interference pattern is an interference pattern of a predetermined type or a superposition of the interference pattern of the predetermined type and a second interference pattern; and determining phase shifts of the first interference pattern in dependence upon detector signals generated by the detector elements located in the portion of the light sensitive substrate where the first interference pattern is formed, and determining imaging properties of the interferometer optics in dependence upon the determined phase shifts, wherein the imaging property comprises coordinates of at least one location on the calibrating element which location is imaged on a corresponding detector element located in the portion of the light sensitive substrate.

12. A method of processing an optical element having an optical surface, the method comprising:

positioning a calibrating element at a calibrating position of an interferometer apparatus, the interferometer apparatus having a light-source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface;

forming a first interference pattern on at least a portion of a light sensitive substrate of the camera, wherein the first interference pattern is generated by wavefronts that are reflected from the reference surface and that interfere with wavefronts interacting with the calibrating element, wherein the calibrating element is configured such that the first interference pattern is an interference pattern of a predetermined type or a superposition of the interference pattern of the predetermined type and a second interference pattern, and wherein the calibrating element is configured such that the interference pattern of the predetermined type comprises interference fringes arranged in two dimensions according to a predetermined two dimensional pattern;

determining phase shifts of the interference pattern of the predetermined type in dependence upon detector signals generated by the detector elements located in the portion of the light sensitive substrate where the first interference pattern is formed, and determining imaging properties of the interferometer optics in dependence upon the determined phase shifts;

positioning the optical element at the measuring position;

forming another interference pattern on the light sensitive substrate of the camera, wherein said another interference pattern is generated by wavefronts that are reflected from the reference surface and that interfere with wavefronts interacting with the optical element;

determining deviations of the optical surface from a target shape thereof based on said another interference pattern; and processing the optical surface of the optical element based on the determined deviations wherein the interference fringes of the interference pattern of the predetermined type are arranged in two dimensions according to a predetermined two-dimensional pattern such that predetermined two-dimensional pattern has periodicity in both a first direction and a second direction different from the first direction.

13. The method according to claim 12, wherein the imaging property comprises an aberration and a scale factor.

14. The method according to claim 12, wherein the processing comprises at least one of magneto-rheological fluid processing, ion beam processing, fluid jet processing, chemical and/or mechanical polishing, etching, milling, grinding, and hot or cold coating processes.

15. The method according to claim 12, wherein the processing comprises processing at locations where the deviations exceed a predetermined threshold.

16. The method according to claim 12, wherein the determining of deviations and the processing are repeatedly performed.

17. The method according to claim 12, wherein the processing comprises a finishing of the optical surface.

18. The method according to claim 17, wherein the finishing comprises applying a coating to the optical surface.

19. The method according to claim 18, wherein the coating comprises at least one of a reflective coating, an anti-reflective coating and a protective coating.

20. A method of processing an optical element having an optical surface, the method comprising:

positioning a calibrating element at a calibrating position of an interferometer apparatus, the interferometer apparatus having a light-source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface;

forming a first interference pattern on at least a portion of a light sensitive substrate of the camera, wherein the first interference pattern is generated by wavefronts that are reflected from the reference surface and that interfere with wavefronts interacting with the calibrating element, and wherein the calibrating element is configured such that the first interference pattern is an interference pattern of a predetermined type or a superposition of the interference pattern of the predetermined type and a second interference pattern;

determining phase shifts of the interference pattern of the predetermined type in dependence upon detector signals generated by the detector elements located in the portion of the light sensitive substrate where the first interference pattern is formed, and determining imaging properties of the interferometer optics in dependence upon the determined phase shifts;

positioning the optical element at the measuring position;

forming another interference pattern on the light sensitive substrate of the camera, wherein said another interference pattern is generated by wavefronts that are reflected from the reference surface and that interfere with wavefronts interacting with the optical element;

determining deviations of the optical surface from a target shape thereof based on said another interference pattern; and processing the optical surface of the optical element based on the determined deviations, wherein the positioning of the calibrating element comprises analyzing the second interference pattern and aligning the calibrating element in the calibrating position in dependence upon the analyzed second interference pattern.

21. The method according to claim 20, wherein the processing comprises at least one of magneto-rheological fluid processing, ion beam processing, fluid jet processing, chemical and/or mechanical polishing, etching, milling, grinding, and hot or cold coating processes.

22. The method according to claim 20, wherein the processing comprises a finishing of the optical surface.

23. The method according to claim 22, wherein the finishing comprises applying a coating to the optical surface.

24. The method according to claim 23, wherein the coating comprises at least one of a reflective coating, an anti-reflective coating and a protective coating.

25. A method of processing an optical element having an optical surface, the method comprising:
   positioning a calibrating element at a calibrating position of an interferometer apparatus, the interferometer apparatus having a light-source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface;
   forming a first interference pattern on at least a portion of a light sensitive substrate of the camera, wherein the first interference pattern is generated by wavefronts that are reflected from the reference surface and that interfere with wavefronts interacting with the calibrating element, and wherein the calibrating element is configured such that the first interference pattern is an interference pattern of a predetermined type or a superposition of the interference pattern of the predetermined type and a second interference pattern;
   determining phase shifts of the interference pattern of the predetermined type in dependence upon detector signals generated by the detector elements located in the portion of the light sensitive substrate where the first interference pattern is formed, and determining imaging properties of the interferometer optics in dependence upon the determined phase shifts;
   positioning the optical element at the measuring position;
   forming another interference pattern on the light sensitive substrate of the camera, wherein said another interference pattern is generated by wavefronts that are reflected from the reference surface and that interfere with wavefronts interacting with the optical element;
   determining deviations of the optical surface from a target shape thereof based on said another interference pattern; and
   processing the optical surface of the optical element based on the determined deviations,
   wherein structures comprising at least one of a plurality of projections and a plurality of indentations are formed on a surface of the calibrating element at predetermined positions, wherein wavefronts reflected from the structures generate interference fringes of the interference pattern of the predetermined type.

26. The method according to claim 25, wherein the surface of the calibrating element has a surface shape substantially corresponding to a surface shape of a surface of the optical element to be measured.

27. The method according to claim 25, wherein the processing of the optical element is performed by a same machine tool used for forming the projections and indentations, respectively, of the calibrating element.

28. The method according to claim 25, wherein at least one positioning mark is further formed on the calibrating element, and wherein the positioning of the calibrating element comprises
   analyzing an image of the at least one positioning mark formed on the camera and aligning the calibrating element in the calibrating position in dependence upon the analyzed image of the at least one positioning mark.

29. The method according to claim 25, wherein the processing comprises at least one of magneto-rheological fluid processing, ion beam processing, fluid jet processing, chemical and/or mechanical polishing, etching, milling, grinding, and hot or cold coating processes.

30. The method according to claim 25, wherein the processing comprises a finishing of the optical surface.

31. The method according to claim 30, wherein the finishing comprises applying a coating to the optical surface.

32. The method according to claim 31, wherein the coating comprises at least one of a reflective coating, an anti-reflective coating and a protective coating.

33. A method of processing an optical element having an optical surface, the method comprising:
   positioning a calibrating element at a calibrating position of an interferometer apparatus, the interferometer apparatus having a light source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface;
   forming a first interference pattern on at least a portion of a light sensitive substrate of the camera, wherein the first interference pattern is generated by wavefronts that are reflected from the reference surface and that interfere with wavefronts interacting with the calibrating element, and wherein the calibrating element is configured such that the first interference pattern is an interference pattern of a predetermined type or a superposition of the interference pattern of the predetermined type and a second interference pattern;
   determining phase shifts of the interference pattern of the predetermined type in dependence upon detector signals generated by the detector elements located in the portion of the light sensitive substrate where the first interference pattern is formed, and determining imaging properties of the interferometer optics in dependence upon the determined phase shifts;
   positioning the optical element at the measuring position;
   forming another interference pattern on the light sensitive substrate of the camera, wherein said another interference pattern is generated by wavefronts that are reflected from the reference surface and that interfere with wavefronts interacting with the optical element;
   determining deviations of the optical surface from a target shape thereof based on said another interference pattern; and
   processing the optical surface of the optical element based on the determined deviations, wherein the calibrating element includes a first grating and a second grating and wherein the interference pattern of the predetermined type is generated by wavefronts that are diffracted by the first grating and that interfere with wavefronts diffracted by the second grating.

34. The method according to claim 33, wherein the reference surface is positioned such that wavefronts reflected from the reference surface substantially do not contribute to the first interference pattern.

35. The method according to claim 33, wherein the positioning of the calibrating element comprises analyzing a third interference pattern generated by wavefronts reflected from the reference surface and interfering with wavefronts diffracted by the first grating, and aligning the calibrating element in the calibrating position in dependence of the analyzed third interference pattern.

36. The method according to claim 33, wherein the processing comprises at least one of magneto-rheological fluid processing, ion beam processing, fluid jet processing, chemical and/or mechanical polishing, etching, milling, grinding, and hot or cold coating processes.

37. The method according to claim 33, wherein the processing comprises a finishing of the optical surface.

38. The method according to claim 37, wherein the finishing comprises applying a coating to the optical surface.

39. The method according to claim 38, wherein the coating comprises at least one of a reflective coating, an anti-reflective coating and a protective coating.

40. A method of processing an optical element having an optical surface, the method comprising:

positioning a calibrating element at a calibrating position of an interferometer apparatus, the interferometer apparatus having a light-source, a camera having a plurality of detector elements, a reference surface and an interferometer optics, wherein the interferometer optics is configured to supply a beam of light generated by the light source to the reference surface and to the optical surface to be measured when the optical surface is positioned at a measuring position of the interferometer apparatus, wherein the interferometer optics is configured to image the reference surface and the optical surface onto the camera such that an interference pattern is generated by wavefronts that are reflected from the reference surface and that interfere with wavefronts interacting with the optical surface;

forming a first interference pattern on at least a portion of a light sensitive substrate of the camera, wherein the first interference pattern is generated by wavefronts that are reflected from the reference surface and that interfere with wavefronts interacting with the calibrating element, and wherein the calibrating element is configured such that the first interference pattern is an interference pattern of a predetermined type or a superposition of the interference pattern of the predetermined type and a second interference pattern;

determining phase shifts of the interference pattern of the predetermined type in dependence upon detector signals generated by the detector elements located in the portion of the light sensitive substrate where the first interference pattern is formed, and determining imaging properties of the interferometer optics in dependence upon the determined phase shifts;

positioning the optical element at the measuring position;

forming another interference pattern on the light sensitive substrate of the camera, wherein said another interference pattern is generated by wavefronts that are reflected from the reference surface and that interfere with wavefronts interacting with the optical element;

determining deviations of the optical surface from a target shape thereof based on said another interference pattern; and processing the optical surface of the optical element based on the determined deviations, wherein the imaging property comprises a mapping between a plurality of the detector elements and coordinates of locations on the calibrating element which locations are imaged on corresponding ones of the plurality of the detector elements.

41. The method according to claim 40, wherein the processing comprises at least one of magneto-rheological fluid processing, ion beam processing, fluid jet processing, chemical and/or mechanical polishing, etching, milling, grinding, and hot or cold coating processes.

42. The method according to claim 40, wherein the processing comprises a finishing of the optical surface.

43. The method according to claim 42, wherein the finishing comprises applying a coating to the optical surface.

44. The method according to claim 43, wherein the coating comprises at least one of a reflective coating, an anti-reflective coating and a protective coating.

* * * * *

UNITED STATES PATENT AND TRADEMARK OFFICE
CERTIFICATE OF CORRECTION

PATENT NO. : 7,436,520 B1
APPLICATION NO. : 11/035723
DATED : October 14, 2008
INVENTOR(S) : Bernd Doerband It is certified that error appears in the above-identified patent and that said Letters Patent is hereby corrected as shown below:

In Column 5, Line 52

Delete "$x(i,j)=u_0+u_1i+u_2j+u_2j+u_3i^2+u_4i\cdot j+u_5j^2+$"

and insert --$x(i,j)=u_0+u_1i+u_2j+u_3i^2+u_4ij+u_5j^2+\cdots$--

In Column 5, Line 54

Delete "$y(i,j)=v_0+v_1i+v_2j+v_3i^2+v_4ij+v_5j^2+$"

and insert --$y(i,j)=v_0+v_1i+v_2j+v_3i^2+v_4ij+v_5j^2+\cdots$--

In Column 6, Line 7

Delete

"$$y(i.j) = \frac{T_y}{2\pi} \cdot \arctan\left( \frac{t'(i,\ j+2\cdot\Delta_y) - t'(i,\ j)}{t'(i,\ j-\Delta_y) - t'(i,\ j+\Delta_y)} \right)$$"

and insert

--$$y(i,j) = \frac{T_y}{2\pi} \cdot \arctan\left( \frac{t'(i,\ j+2\cdot\Delta_y) - t'(i,\ j)}{t'(i,\ j-\Delta_y) - t'(i,\ j+\Delta_y)} \right)$$--

UNITED STATES PATENT AND TRADEMARK OFFICE
CERTIFICATE OF CORRECTION

PATENT NO. : 7,436,520 B1
APPLICATION NO. : 11/035723
DATED : October 14, 2008
INVENTOR(S) : Bernd Doerband It is certified that error appears in the above-identified patent and that said Letters Patent is hereby corrected as shown below:

In Column 14, Line 38

Delete "detector elements a reference surface and an interface interferometer" and insert --detector elements, a reference surface and an interferometer--

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,436,520 B1
APPLICATION NO. : 11/035723
DATED : October 14, 2008
INVENTOR(S) : Bernd Doerband It is certified that error appears in the above-identified patent and that said Letters Patent is hereby corrected as shown below:

In Column 5, Line 52

Delete "$x(i,j)=u_0+u_1i+u_2j+u_2j+u_3i^2+u_4i\cdot j+u_5j^2+$"

and insert --$x(i,j)=u_0+u_1i+u_2j+u_3i^2+u_4i\cdot j+u_5j^2+\ldots$ --

In Column 5, Line 54

Delete "$y(i,j)=v_0+v_1i+v_2j+v_3i^2+v_4i\cdot j+v_5j^2+$"

and insert --$y(i,j)=v_0+v_1i+v_2j+v_3i^2+v_4i\cdot j+v_5j^2+\ldots$ --

In Column 6, Line 7

Delete

" $$y(i,j) = \frac{T_y}{2\pi} \cdot \arctan\left(\frac{r'(i, j+2\cdot\Delta_y) - r'(i, j)}{r'(i, j-\Delta_y) - r'(i, j+\Delta_y)}\right)$$ "

and insert

-- $$y(i,j) = \frac{T_y}{2\pi} \cdot \arctan\left(\frac{r'(i, j+2\cdot\Delta_y) - r'(i, j)}{r'(i, j-\Delta_y) - r'(i, j+\Delta_y)}\right)$$ --

UNITED STATES PATENT AND TRADEMARK OFFICE
CERTIFICATE OF CORRECTION

PATENT NO. : 7,436,520 B1
APPLICATION NO. : 11/035723
DATED : October 14, 2008
INVENTOR(S) : Bernd Doerband It is certified that error appears in the above-identified patent and that said Letters Patent is hereby corrected as shown below:

In Column 14, Line 38

Delete "detector elements a reference surface and an interface interferometer" and insert --detector elements, a reference surface and an interferometer--

This certificate supersedes the Certificate of Correction issued May 26, 2009.

Signed and Sealed this

Twenty-first Day of July, 2009

JOHN DOLL
*Acting Director of the United States Patent and Trademark Office*